Figure 1:
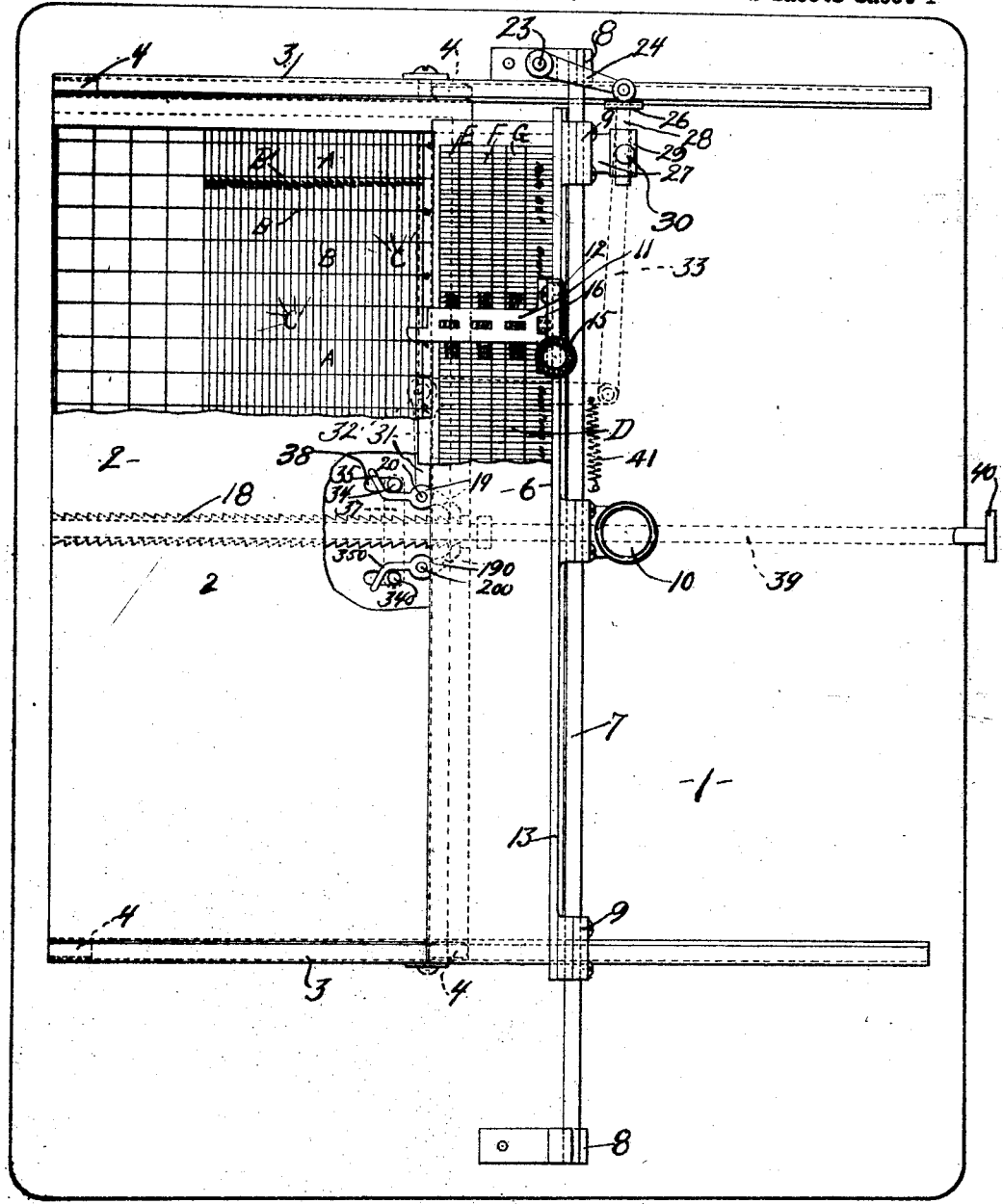

Aug. 4, 1925.

W. ROCKWELL 1,548,173

WAGE OR COST COMPUTER

Filed Sept. 1, 1921

2 Sheets-Sheet 1

William Rockwell INVENTOR.

BY

Parsons Bodell ATTORNEY.

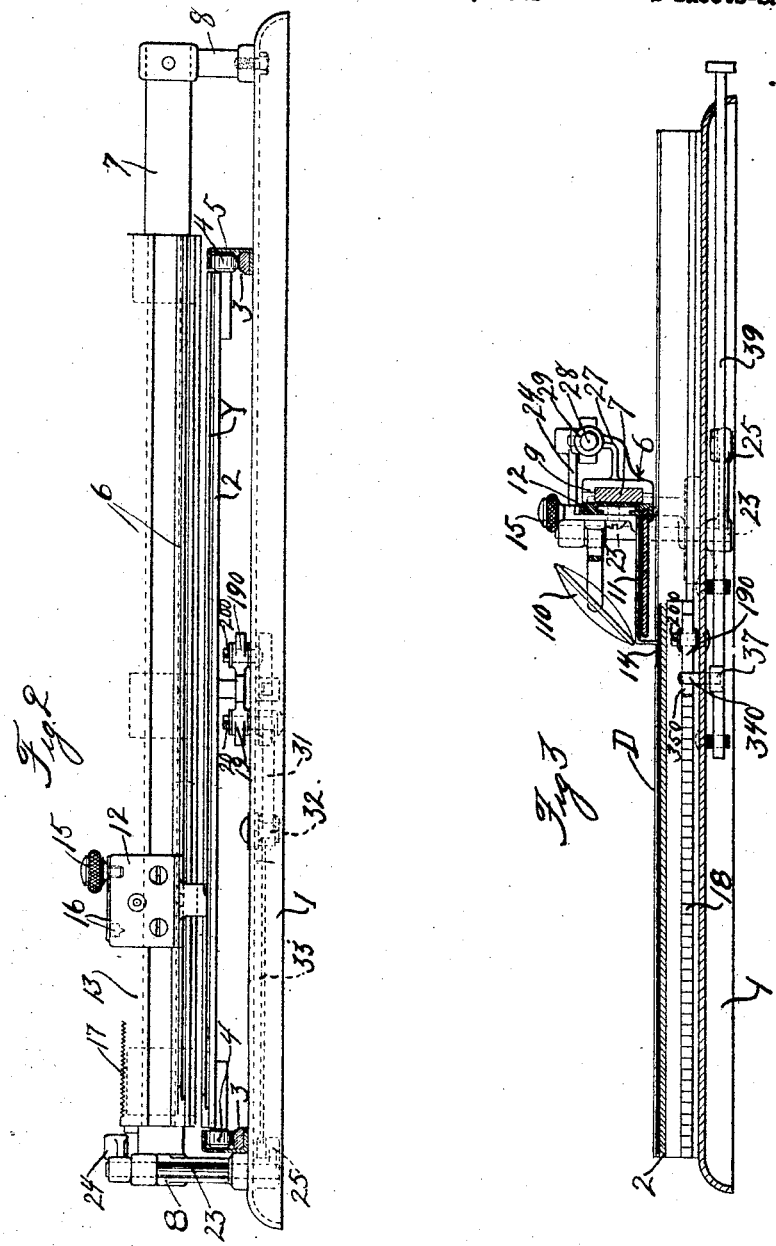

Patented Aug. 4, 1925.

1,548,173

UNITED STATES PATENT OFFICE.

WILLIAM ROCKWELL, OF GARDNER, MASSACHUSETTS.

WAGE OR COST COMPUTER.

Application filed September 1, 1921. Serial No. 497,466.

*To all whom it may concern:*

Be it known that I, WILLIAM ROCKWELL, a citizen of the United States, and a resident of Gardner, in the county of Worcester and State of Massachusetts, have invented a certain new and useful Wage or Cost Computer, of which the following is a specification.

This invention has for its object a wage or cost computer, or indicator for indicating the elapsed time or the wages or amount payable for work requiring a certain length of time at a given rate, which is particularly simple and compact in construction and highly efficient, rapid and accurate in use; and which is especially adapted to be used in connection with the time sheets of time recorders in which the "in" and "out" registrations or the time of beginning and ending of a job are made on a time sheet mounted on a carrier as a drum which is time controlled, as for example, the record sheets of Simplex time recorders.

The invention consists in the novel features and in the combinations and constructions hereinafter set forth and claimed.

In describing this invention, reference is had to the accompanying drawings, in which like characters designate corresponding parts in all the views.

Figure 1 is a plan view, partly broken away, of this computer.

Figures 2 and 3 are sectional views on lines 2—2, and 3—3, respectively of Fig. 1.

The computer or indicator is of the type or nature which indicates the elapsed time or the wages to be paid at a given rate for the elapsed time, on a chart containing the computations, the position of the indicator or gage along which the reading on the chart is made, being determined from the "in" and "out" registrations made on a time record sheet having spaces for the registrations of a number of workmen, say fifty, which receive the same rate of pay, the registrations of each workman being in line and the distance between the "in" and "out" registrations of each workman being indicative of the time such workman was at work. The time sheet shown is that used with the well-known Simplex time recorder, which has a drum on which the sheet is placed which drum rotates in synchronism with the hour hand of the clock.

The computer or indicator comprises, generally a carrier for a computing sheet having an edge, as a straight edge, conforming to each line of "in" and "out" registrations on the record sheet, the computations advancing lengthwise of such edge from one end of the carrier toward the other end, and a gage shiftable lengthwise of the carrier and with the carrier at will, the gage having an edge or reading line extending transversely of the computing sheet and the line of in and out registrations of the record sheet. The carrier is arranged with its edge along one line of "in" and "out" or similar registrations on the record sheet with the zero computation and gage in line with the first "in" registration. The gage is then shifted along the carrier and the sheet to the "out" registration. The carrier and gage are then shifted bodily, or together without shifting the gage relatively to the carrier, or the record sheet is shifted along the carrier until the gage is in line with the next "in" registration. This shifting eliminates the time not to be computed, as noon hours. The gage is then shifted along the carrier until in line with the next "out" registration and the reading on the computation sheet in line with the gage indicates either the elapsed time or the wages for the elapsed time, or both.

Preferably the device comprises a carriage for the record sheet, and more specifically the computer or indicator here illustrated, comprises a suitable frame or base, a carriage for the time record sheet, a second carrier or carriage for the computer sheet, a gage shiftable with and along the second carriage and along the first carriage, the carriages having relative movement in one direction to bring the registrations of the different workmen successively to computing position along the second carriage, and in a direction at an angle to the former movement to position the computing sheet and gage along the line of registrations in computing position. If further preferably comprises spacing mechanism operable by the carriage shiftable during the second of such relative movements when such carriage is approaching the end of its movement, to effect the first of such relative movements.

In the illustrated embodiment of my invention, the carriage for the time record sheet is shiftable along the base in one direction to bring the line of registration of each workman into computing position, and the computing sheet carriage is shiftable along the base over the former carriage in a direction at an angle to the movement of the former carriage, and the spacing mechanism operates to shift the former carriage and is operated by the computing sheet carriage, as it reaches the end of its movement after each computing operation, preferably as it approaches its starting position.

1 designates the base or frame which may be of any suitable form, size and construction.

2 is the record sheet carriage movable along tracks or guides 3 thereon, it being here shown as having rollers 4 movable in grooves or channels 5 in the tracks 3.

Y designates the record sheet, it being shown as subdivided into columns A by lines B, the distance between the lines representing a period of time, as one hour. It is also divided in rows C extending across the columns, the rows being numbered from 1 to 50.

The rows are assigned to workmen correspondingly numbered. The columns A are divided by lines B' in half hour spaces, and the half hour spaces are subdivided in smaller divisions (not shown) as five minute spaces.

This sheet is used in a time recorder, as a Simplex time recorder, and is placed on the periphery of a drum rotated in synchronism with the hour hand of a time movement every five minutes, the sheet being arranged with the columns A and lines B running lengthwise of the drum. Such machine has a series of markers, one for each workman, these markers being arranged in a row running lengthwise of the drum.

When a workman enters, he actuates his marker, which in the Simplex machines is a needle, and punches a small hole in one of the columns A and in the workman's row C. When the workman leaves he repeats the operation, so that a punch mark or pin prick is made at the entering and leaving time of both morning and afternoon.

For instance, workman No. 1 enters at 8 a. m. and actuates his marker leaving a small hole or pin prick in row C No. 1 and along line B having the heading 8. When he leaves at say 11 a. m. he repeats the operation. When he enters in the afternoon say at 1 p. m. he actuates the marker and leaves a pin prick in row C No. 1 on line B with the heading 1 and when he leaves at 5 p. m. again makes a pin prick in row C No. 1 in line with the heading 5. Other workmen 2 to 50 make similar records in their respective rows C.

6 designates the second or computing sheet carriage which is a shelf or plate movable transversely of the carriage 2 in a plane above the face of the carriage 2 along a guide, as a rod 7, supported at its ends by uprights 8 rising from the base 1, the shelf or plate having brackets 9 which are slidably mounted on the rod. The carriage 6 is provided with a suitable handle 10 by which it is moved along the rod 7.

D designates the computing or rate sheet which has parallel columns E F G, the column E having computations in dollars and cents at a given rate per hour as 83¢, the column F having time indications in hours and minutes, corresponding to the divisions and subdivisions of the columns B of the record sheet. That is, the column F has time computations advancing in multiples of 5, as 5, 10, 15, 20, 25, 30, 35, 40, 45, 50, 55, minutes, 1 hour, 1:05, 1:10, etc. The time computations are paired with, and read across from, the rate computation in column E. The column G has money computations for over time work figured at one and one-half times the regular rate. 10 is the handle on the carriage 6 for sliding it along the guide 7.

11 is the gage having a bracket or base 12 slidable along the guide rod 13 supported by the brackets 9, the gage being slidable over the face of the carriage 6 and having sight or reading slots through which the computations to be taken are read. It also has a finger or indicator 14 overhanging and movable along the row of records on the record sheet, at the computing line. To facilitate the reading, a magnifying glass 110 is suitably supported in juxtaposition to the gage.

The bracket or base 12 of the gage 11 is provided with a suitable handle 15 and also with a spring pressed ratcheting pawl 16 which coacts with teeth 17 on the upper edge of the guide rod 13 for the gage, the teeth being spaced in accordance with the finest or smallest time subdivisions of the record sheet on the carriage 2, that is, in this instance, in subdivisions representing five minute periods. The teeth 17 incline in both directions so that the pawl 16 ratchets in either direction, when sufficient force is applied to the handle 15 in either direction to overcome the holding effect of the pawl.

The spacing mechanism for feeding the record sheet carriage to carry the rows of registration of the workman, as 1 to 50, to the computing line along the edge of the computing sheet carriage 6, comprises a rack associated with the carriage 2, a pawl coacting with the rack, a carrier for the pawl, an actuator arranged in the path of a part movable with the carriage 6 and connections between the actuator and the pawl.

18 designates the rack which is here shown as double and as carried by the carriage 2 midway between the tracks 3, for the carriage. 19 is a pawl coacting with the rack. 23 is the actuator here shown as an upright rock shaft journalled in the base at one side of the carriage 2 and at the end of the path of the carriage 6, and having rock arms 24, 25, at its upper and lower ends, the upper arm 24 being arranged in the path of a pusher 26 associated with the carriage 6, and carried by an arm 27 projecting from one of the brackets 9 of such carriage. The pusher 26 has a stem 28 adjustable endwise in a bearing 29 on the arm 27 and is held in its adjusted position by a set screw 30. The lower arm 25 is connected to the pawl 19. The connection, as here illustrated, comprises an angle lever or bell crank 31 pivoted at 32 to the base below the carriage 2, one arm being connected by a link 33 to the lower arm 25 of rock shaft 23, and the other arm being pivoted to the pawl 19 at 20. The pawl 19 is disengaged from the rack 18 after the rack has been fed one step, by suitable means as a pin or knock-off device 34, arranged in the path of the inclined tail 35 of the pawl 19 to engage such tail and move the pawl on its pivot 20 against the action of its spring after the rack has been fed one step. This pin is carried by a slide or carrier 37, located beneath the base 1 and projects through a slot 38 in the floor of the base. 190 is a pawl coacting with the rack 18 to prevent retrograde movement of the rack when the pawl 19 is out of engagement with the rack, or during ratcheting of the pawl 19 to take a new hold. This pawl 190 is similar to the pawl 19 but is pivoted at 200 to the base 1. Also a knock-off pin 340 on the carrier 37 coacts with the tail 350 of the pawl 190. The carrier 37 is operable to disengage the pawls 19, 190, from the racks to permit the carriage to be reset in its starting position, or to be set by hand by suitable means, as a rod 39 slidable beneath the floor of the base, and connected to the carrier 37 at its inner end and having a handle 40 at its outer end.

Obviously when the pusher 26 engages the rock arm 24 the shaft 23 will be rocked, and the motion transmitted to the pawl 19 by the link 33 and bell crank 31, causing the pawl 19 to be shifted to the right, Fig. 1, and shift the rack 18 and carriage 2 one step to the right. As the pawl 19 approaches the limit of its throw to the right, Fig. 1, the tail 35 thereof engages the pin 34, which moves the pawl 19 out of engagement with the rack 18. When the carriage 6 is moved along its guide and disengages the pusher 26 from the arm 24 of the actuator shaft 23, the spring 41 returns the actuator and the connections to their starting positions, and hence moves the pawl 19 away from the pin 34, so that the pawls will take a new hold on the rack 18 for the next shifting operation.

In operation, the time sheet is placed on the carriage 2, and the proper rate or computing sheet on the carriage 6, both carriages being in starting position, Fig. 1, so that the line of registration A of workman No. 1 is in computing position along the edge of carriage 6. The gage 11 is then shifted to the starting end of carriage 6 and the carriage 6 shifted without disturbing the gage until the finger 14 of the gage is in line with the first "in" registration or pin prick. The gage is then slid along the carriage 6 until it is in line with the noon "out" registration. The carriage 6 is then moved bodily downwardly along its guide until the gage 11, which has not been disturbed, is in line with the afternoon "in" registration or pin prick. This movement of the carriage 2 without disturbing the gage 11 eliminates the time out at noon so that only elapsed time is computed. The gage 11 is then shifted until it is in line with the night "out" registration. A reading through the sight opening of the gage 11 exposing the first column on the computing sheet gives the wages due for the time at work, and through the slot exposing the second column gives the elapsed time. For the wages due for over time, when figured at a different rate, from regular time, the reading is made in the third column.

The carriage is then shifted upwardly, Fig. 1, to starting position and as it reaches its starting position, the pusher 26 engages and actuates the rock arm 24 of the spacing mechanism for the carriage 2, and shifts the carriage 2 to bring the next line of registrations or pin pricks of the record sheet to the computing line. When all the computations are made the handle 40 of the rod 39 is pressed inwardly to move the pins 34 into engagement with the tails 35 of the pawls 19 to disengage the pawls 19 from the racks 18 so that the carriage 2 can be moved to left to its starting position and a new record sheet placed thereon.

What I claim is:

1. In a wage or cost computer of the nature set forth, a supporting base, a carriage for a record sheet having "in" and "out" registration thereon, a second carriage for a computing sheet, a gage associated with the second carriage, the carriages having relative movement in one direction, to bring the line of registrations of different workmen successively into computing position and in a direction at a right angle to the former movement to position the rate sheet and gage along the line of registrations in computing position, and spacing mechanism operable by the carriage shiftable during the second of such relative movements when approaching its starting position to effect the first of such relative movements, substantially as and for the purpose specified.

2. In a wage or cost computer of the nature set forth, a supporting base, a carriage for a record sheet having "in" and "out" registrations thereon, a second carriage for a computing sheet, a gage associated with the second carriage, the carriages having relative movement in one direction, to bring the line of registrations of different workmen successively into computing position and in a direction at a right angle to the former movement to position the rate sheet and gage along the line of registration in computing position, and spacing mechanism comprising a rack movable with the carriage shiftable during the first of such relative movements, a pawl carrier, a pawl pivoted to the carrier and coacting with the rack, an actuator arranged at the end of the path of movement of the carriage shiftable during the second of such relative movements, connections between the actuator and the pawl carrier, and means for effecting the pivotal movement of the pawl to disengage it from the rack at the end of the shifting movement and to re-engage it with the rack when the pawl carrier is restored to its initial position, and means for restoring the actuator, pawl carrier and connections to their initial positions, substantially as and for the purpose described.

3. In a wage or cost computer of the nature set forth, comprising a supporting base, a carriage for a record sheet shiftable along the base, a guide carried by the base and extending in a direction at a right angle to the movement of the record sheet carriage, a carriage for a computing sheet movable along the guide, a gage associated therewith and slidable along the second carriage over the computing sheet and along the line of time registrations at the computing line and spacing mechanism coacting with the first carriage to shift the same and including an actuator arranged in the path of movement of the second carriage to be engaged thereby when the second carriage approaches the end of its movement along the guide, substantially as and for the purpose described.

In testimony whereof, I have hereunto signed my name, at Gardner, in the county of Worcester, and State of Massachusetts, this 22d day of August, 1921.

WILLIAM ROCKWELL.